United States Patent Office 2,764,521
Patented Sept. 25, 1956

2,764,521

PROCESS FOR THE PREPARATION OF CONCENTRATES OF VITAMIN $B_{12}$ ACTIVE SUBSTANCES

Abraham Leviton, Washington, D. C., assignor to the United States of America as represented by the Secretary of Agriculture No Drawing. Application January 6, 1953,
Serial No. 329,934

3 Claims. (Cl. 167—81)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a method of recovering a concentrate of vitamin $B_{12}$ active substances from the fermentation liquors obtained in the growth of organisms of the genus, Propionibacterium.

In the preparation of concentrates of vitamin $B_{12}$ active substances either from natural products such as liver, or from fermentation liquors that are obtained with *S. griseus*, it is the practice to process the starting material in such a manner that the vitamin is released from any particulate matter into the original surrounding fluid or mother liquor. The vitamin released in this manner supplements the vitamin already present in the mother liquor; and this augmented mother liquor is then processed, usually with charcoal adsorption as a first step in order to produce either the crystalline vitamin $B_{12}$ active substances, or a concentrate thereof.

The method by means of which the vitamin active substances are released from particulate matter usually comprises, as with liver, enzymatic digestion with protease preparations, or as with fermentation liquors, heat treatment at low pH. These methods are objectionable in that enzymatic digestion may fail to liberate all of the bound substances, and may even lead to the destruction of active substances; and heat treatment in acid solutions may lead to the destruction of the more heat labile active substances. The bound vitamin is released by these treatments into its mother liquor, a liquor which, if derived from fermentation processes, is rich in soluble solids. Since the degree of enrichment and concentration is usually expressed as the ratio between the quantity of vitamin $B_{12}$ active substances and the quantity of extraneous solids with which it is associated, it is clear that no matter how efficient the method by means of which the vitamin $B_{12}$ active substances are released into the surrounding mother liquor, a comparatively low purity is obtained because of the solids content of the mother liquor.

It is the object of this invention to produce a concentrate of vitamin $B_{12}$ active substances of greater concentration and higher purity than can be achieved by the methods which have hitherto been proposed.

The achievement of this object is made possible by the employment of a number of simple steps. The inventor has observed that in the microbiological synthesis of vitamin $B_{12}$-like active substances, particularly in the synthesis by organisms belonging to the genus, Propionibacterium, the activity is found to reside entirely in the bacterial cells. These bacterial cells, in themselves, constitute a rich source of vitamin $B_{12}$ active substances; and the first step of the invention consists in the harvesting of these cells. This may be effected by filtration, by centrifugation, or by the employment of chemicals. It is not this first step, however, in which the essential novelty of the inventor's process lies. Rather it is in the second.

The inventor has observed that when acetone is added to a suspension of bacteria, particularly a suspension of bacteria belonging to the genus, Propionibacterium, in such a proportion that the concentration is about 50% v./v., the bacterial cells are agglutinated and the vitamin active substances are released into the surrounding fluid. Filtration is easily accomplished to yield an orange-red solution. Passage of this solution through a column of Florosil (a purified fuller's earth) or mixing with Florosil results in the removal of yellow pigmented material to leave a pinkish-red solution with an absorption spectrum in the visible portion of the spectrum, somewhat characteristic of vitamin $B_{12}$ active substances. The concentrates obtained in this manner may be dried to yield a product containing up to 0.12% vitamin $B_{12}$ active substances.

In some instances, it may be found that vitamin-bearing non-cellular particulate solids are associated with the harvested cells, and it may be necessary to apply some measure of heat in order to effect the complete release of the vitamin. In order to obviate the undesirable destructive action which such heat would exert on heat-labile vitamin active substances, it is desirable to add sodium bisulfite and to buffer the suspension at pH 4.5 by means of an acid, such as hydrochloric acid, for example. In this manner, conditions are obtained for the stabilization of the heat-labile substances. Such a stabilizing action has already been reported by H. W. Loy, J. F. Haggerty, and O. L. Kline in their paper on "The Stability of Vitamin $B_{12}$ and $B_{12b}$", Journal of Association of Official Agricultural Chemists, vol. 35, No. 1, pages 169–174 (February 1952).

The following specific examples are merely illustrative of the invention, and are not intended as a restriction:

Example 1

A fermentation liquor derived from the fermentation by *P. freudenreichii* of a medium containing glucose, 1.1% N-Z-amine (type A) 1.5%, yeast extract, 0.3% and $Co^{++}$ in trace quantities was centrifuged and the cells harvested. All of the activity belonging to vitamin $B_{12}$-like substances, 1.1 mgs. per l., was found to reside in the cells, 2 g. per l. The cells were washed thoroughly and harvested. The harvested cells were treated with an equal volume of acetone, whereupon they were observed to agglutinate and to settle. The mother liquor was easily removed by decantation and assayed. It was found to contain all of the activity. Upon mixing with 1% Florosil, filtering and concentrating, a concentrate containing 5.5 mgs. active substances per gram solids was obtained.

Example 2

The steps listed in Example 1 were carried out with a fermentation liquor derived from the fermentation of a medium containing 5.3% lactic acid, 1.5% N-Z-amine, 0.3% yeast extract and $Co^{++}$ in trace quantities. A concentrate containing 12 mgs. active substances per gram solids was obtained.

Example 3

The steps listed in Example 1 were carried out with a fermentation liquor derived from the fermentation of a medium containing 3% lactic acid, 1.5% N-Z-amine, 0.3% yeast extract, and $Co^{++}$ in trace quantities. A concentrate containing 6.8 mgs. active substances per g. solids was obtained.

Example 4

The steps listed in Example 1 were carried out with a fermentation liquor derived from the fermentation of a medium containing 5.3% lactic acid, 1.5% tryptic digest of casein, 0.3% yeast extract, and traces of $Co^{++}$.

A concentrate containing 8.6 mgs. active substances per g. solids was obtained.

Example 5

To 100 ml. of a concentrated suspension of cells (5.4 g. dry weight) were added 0.1% sodium bisulfite and hydrochloric acid to bring the pH to 4.5. The mixture was heated to boiling and held at boiling temperature for two minutes, after which it was cooled to room temperature, and to it an equal volume of acetone was added. The cells agglutinated and were easily separated from the mother liquor. The resulting clear filtrate was shaken with 1% Florosil and filtered. The filtrate was reduced in volume to 12 ml. Examined spectrophotometrically, it yielded an absorption curve with maxima at $525\mu\mu$, $365\mu\mu$, $352-355\mu\mu$, and $420\mu\mu$. From the maximum at $525\mu\mu$, the vitamin $B_{12}$ active substance calculated as vitamin $B_{12b}$ was found to be $1.3 \times 10^{-4}$ g. per ml. This value agreed closely with the value $1.4 \times 10^{-4}$ g. per ml. obtained microbiologically, and indicated that a high degree of purity had been achieved with respect to impurities which absorb light in the region $500-600\mu\mu$. The general shape of the absorption curve belonging to vitamin $B_{12b}$ was apparent though not definite in the curve belonging to the concentrate, and showed that a degree of purity had been reached which required many more steps and operations with other methods.

It is desired to point out that the concentration of acetone required to effect the stripping of the cells must not exceed by much the critical concentration of about 50% v./v.; otherwise, the vitamin $B_{12}$ active substances will be precipitated with the cells. Nor must it be appreciably under the critical concentration lest the precipitation and stripping of the cells should be incomplete.

I claim:

1. A method for obtaining substances having vitamin $B_{12}$ activity from fermentation liquors resulting from the growth of bacteria of the genus, Propionibacterium, comprising separating the cells from the liquor, adding to said separated cells a substantially equal volume of acetone, separating the resulting agglutinated cells from their supernatant liquid, and concentrating said supernatant liquid to obtain a concentrate having vitamin $B_{12}$ activity.

2. A method for obtaining concentrates having vitamin $B_{12}$ activity from fermentation liquors resulting from growth of bacteria of the genus, Propionibacterium, comprising separating the cells from the liquor, washing the cells, adding to the washed cells a substantially equal volume of acetone, separating the resulting agglutinated cells from their supernatant liquid, mixing fuller's earth with said supernatant liquid, filtering the resulting mixture, and concentrating the filtered liquor to obtain a concentrate having vitamin $B_{12}$ activity.

3. A method for obtaining substances having vitamin $B_{12}$ activity from fermentation liquors resulting from growth of P. freudenreichii comprising separating the cells from the liquor, washing the cells, adding to the washed cells a substantially equal volume of acetone, separating the resulting agglutinated cells from their supernatant liquid, mixing fuller's earth with said supernatant liquid, filtering the resulting mixture, and concentrating the filtered liquor to obtain a concentrate having vitamin $B_{12}$ activity.

References Cited in the file of this patent
UNITED STATES PATENTS

| | | |
|---|---|---|
| 2,530,416 | Wolf | Nov. 21, 1950 |
| 2,595,159 | Meyer | Apr. 29, 1952 |
| 2,595,499 | Wood | May 6, 1952 |

OTHER REFERENCES

Rickes: Sci., vol. 108, Dec. 3, 1948, pp. 634, 635 (167—81$B_{12}$).

Leviton and Hargrove: Industrial and Engineering Chemistry, (Anal. Ed.) vol. 44, November 1952, pp 2651 to 2655. (Copy in Sci. Libr.). (195—96.01$B_{12}$).